Apr. 3, 1923.

L. McGUIRE 1,450,214

ELECTRICALLY OPERATED VEHICLE SIGNAL

Filed Dec. 26, 1919

Lee McGuire.
Inventor

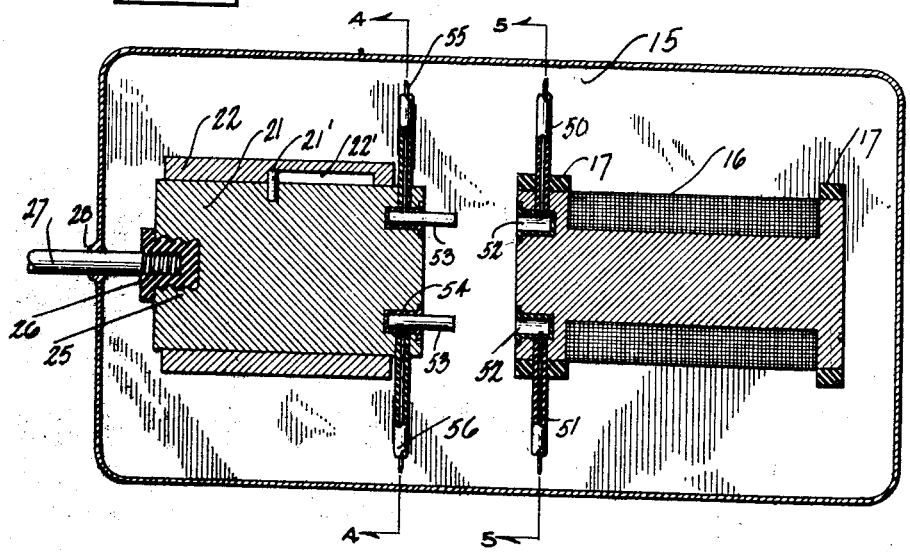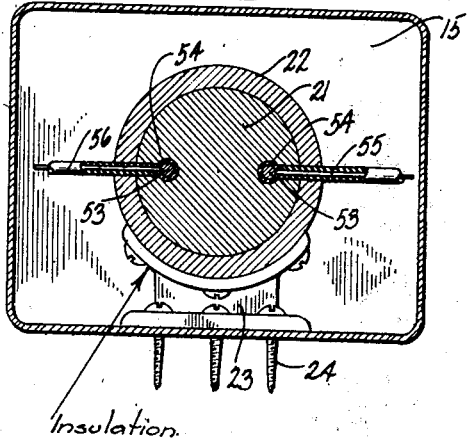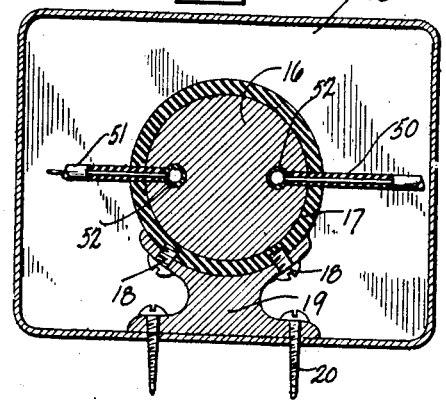

Patented Apr. 3, 1923.

1,450,214

UNITED STATES PATENT OFFICE.

LEE McGUIRE, OF PAINT LICK, KENTUCKY.

ELECTRICALLY-OPERATED VEHICLE SIGNAL.

Application filed December 26, 1919. Serial No. 347,492.

*To all whom it may concern:*

Be it known that I, LEE McGUIRE, a citizen of the United States, residing at Paint Lick, in the county of Garrard and State of Kentucky, have invented certain new and useful Improvements in Electrically - Operated Vehicle Signals, of which the following is a specification.

This invention relates to signals for motor vehicles, and the primary object of the invention is to provide an improved means electrically operated for indicating to drivers of other vehicles, the direction in which the vehicle carrying said signalling means is going to turn.

Another object of the invention is to provide an attachment for motor vehicles embodying a pair of semaphore arms located on the opposite sides of the vehicle body and having means for operating either one of said arms for indicating the direction in which the machine is going to turn.

A further object of the invention is to provide magnetic means for operating the semaphore arm, said magnetic means being electrically connected by suitable conductors to the ordinary lighting system of the motor vehicle.

A further object of the invention is to provide means for closing an electric circuit to signal lights carried by the semaphore arms when the semaphore arms are actuated, the said circuits being connected to the ordinary lighting circuit of the motor vehicle and being controlled by the ordinary lighting switch, so that the signal lights will be lighted only when the usual vehicle lights are in use.

A still further object of the invention is to provide an improved direction indicator for motor vehicles of the above character which is durable and efficient in use, one that is simple and easy to manufacture, and one which can be placed upon the market and installed on a motor vehicle at a minimum cost.

Other objects of the invention will appear in the following detail description taken in connection with the drawings forming a part of this specification, in which drawings:

Figure 3 is a vertical longitudinal section through the magnetic means for operating one of the semaphore arms and for closing the electric circuit to the signal light, when the ordinary lighting circuit of the motor vehicle has been closed.

Figure 4 is a detail transverse section taken on the line 4—4 of Figure 3.

Figure 5 is a detail transverse section taken on the line 5—5 of Figure 3.

Figure 1:
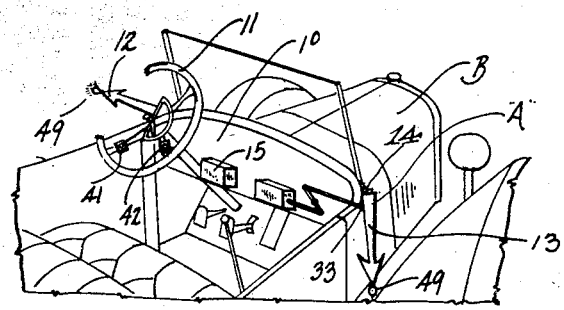
Figure 1 is a fragmentary detail perspective view of a motor vehicle showing the improved signalling attachment, one of the signalling arms being shown in operative position.
Figure 2:
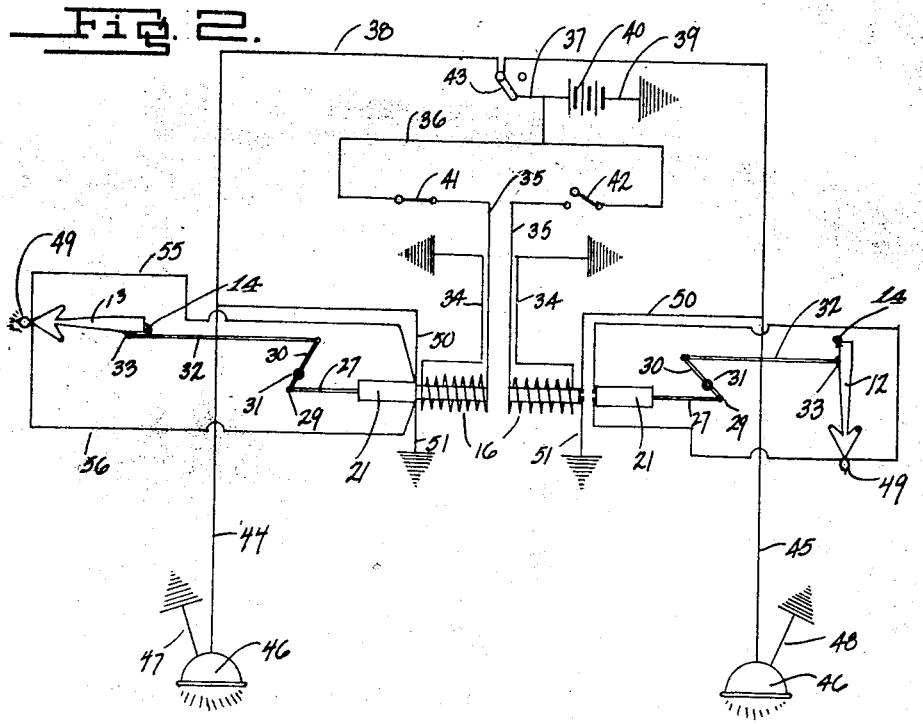
Figure 2 is a diagrammatic view of the wiring circuits.

Referring to the drawings in detail, wherein similar reference characters designate corresponding parts throughout the several views, the letter A indicates the improved signalling attachment for a motor vehicle B which may be of the ordinary or any preferred type or make, and the same is provided with the usual instrument board 10, and steering wheel 11.

The improved signalling attachment A includes a pair of signalling arms 12 and 13 which are located on the opposite sides of the vehicle, and are hingedly connected thereto by suitable hinges 14, which are secured to the inner ends of the semaphore arms 12 and 13 and to the forward end of the vehicle body.

A casing 15 is provided for each one of the arms 12 and 13, and each of the casings is secured to a convenient portion of the vehicle body such as the instrument board 10 and each of the casings contain the means for operating the arms. The operating means for the arms are identical in construction and therefore the description of the operating means for one of the arms will do for the other arm. The operating means includes an electromagnet 16 which is held in place by suitable insulating rings 17 secured by screws or the like 18 to an attaching bracket 19. The attaching bracket 19 is secured to the rear wall of the casing 15 by suitable fastening elements 20, and these fastening elements also form means for attaching the casing 15 to the instrument board 10. A sliding armature 21 is provided for the electromagnet and the same is held in position by a suitable guide 22 secured to an attaching bracket 23 which is held in place by suitable fastening elements 24, which also extend into the dash to hold the casing in position. The outer end of the armature 21 is provided with a threaded socket 25 for the reception of the insulating plug 26, which has fitted therein the operating rod 27, and the outer end wall of the casing 15 is provided with a slotted opening 28 for the reception of the same. The outer end of the operating rod 27 is pivotally connected by a pin 29 to a lever 30 which is rotatably mounted intermediate its ends upon a pivot pin 31. The outer end of the lever 30 is pivotally connected to a rod 32 which is in turn pivotally connected to a bracket 33 secured to the signal or semaphore arm in advance of the hinged connection 14. The pivot point 31 of the lever 30 is arranged relatively near the pivot point 29 of the operating rod 27, so that upon a slight movement of the operating rod the outer end of the lever will move through a relatively long arc and thus slide the rod 32 for a relatively long distance for raising the semaphore or signal arm.

Each of the electromagnets 16 have their terminals connected to conductor wires 34 and 35, and the wires 35 of each of the coils 16 is connected together by a connecting wire 36 which in turn is connected to one of the lead wires 37, of the electric light circuit 38 of the motor vehicle. The opposite lead wire 39 of the one terminal of the battery 40 or any suitable source of electric energy is grounded to the frame of the vehicle. The conductor wires 34 of each of the electromagnet coils are also grounded to the frame of the vehicle and each of the wires 35 of the electromagnets are provided with switches 41 and 42, so that upon the closing of either one of the switches the respective semaphore arms will be raised. The electric light circuit 38 has interposed therein the usual controlling switch 43 and this circuit includes the two wires 44 and 45 leading from said switch to one of the terminals of the headlights 46 and the opposite terminals of the headlights are grounded to the frame of the vehicle by suitable wires 47 and 48.

When the semaphore signal arms 12 and 13 are in their lowered position the incandescent lamps 45 carried by the terminals thereof will not be lit irrespective of the fact whether the switch 43 is in opened or closed position, and to permit the lamps 49 to be lit when the semaphore arms are in their raised position, when the ordinary lights of the motor vehicle are lit, conductor wires 50 and 51 are provided for each of the electromagnets which extend into the magnet and are electrically insulated therefrom. The terminals of the wires 50 of each electromagnet are secured to the line wires 44 and 45 of the headlights, while the wires 51 are grounded to the frame of the vehicle. The inner terminals of the wires 50 and 51 are extended into insulating sockets 52 embedded in the inner face of the electromagnets, and these insulating sockets are adapted to receive conductor dowel pins 53 carried by the inner face of the movable armatures 21. These pins 53 are electrically insulated from the armatures by suitable insulating sockets 54. The pins 53 have electrically connected thereto suitable wires 55 and 56, which are carried by the armatures 21 and suitably insulated therefrom. The wires 55 and 56 are connected to the terminals of the lamps 49 carried by the semaphore signal arms 13. Thus it will be seen that when the switch 43 is in its closed position and when one of the semaphore arms is in its raised position, the current will flow from the battery 40 through the wire 44, the wire 50 into the wire 55 through the lamp 49 into the wire 56 through the wire 51 and into the ground back into the battery 40 through the wire 39.

From the foregoing description it can be seen that an improved electrically operated direction indicator for motor vehicles is provided of exceptionally simple and durable construction, and which will be easy to operate as the control switches 41 and 42 are placed on the steering wheel 11 of the vehicle.

By closing one of the switches 41 and 42 one of the magnets 16 will be energized, thereby attracting one of the armatures 21 and raising one of the semaphore arms through the medium of the rods 27 and 32 and the lever 30. As soon as the circuit is broken the arms will drop to their normal positions by gravity.

Changes in details may be made without departing from the spirit or scope of my invention; but,

I claim:

1. An electric operating device for vehicle directing signals comprising a casing, an electric magnet disposed in the casing, a guide shell arranged in the casing in alignment with the magnet, an armature for the magnet reciprocably mounted in said guide shell, means for limiting the sliding movement of the armature, and an operating rod secured to the armature and slidably supported by the casing.

2. An electrical operating device for vehicle signals comprising an electric magnet, a guide, an armature for the magnet slidably mounted in the guide, means for closing the circuit through the magnet for attracting said armature, an outwardly extending operating rod secured to the armature, and an actuating lever pivotally secured intermediate its ends, and means pivotally connecting the outer ends of the operating rod to one end of said actuating lever.

3. In an electrical operating device for vehicle signals, an electrical magnet, a guide shell arranged in alignment with the magnet, an armature for the magnet slidably mounted in said shell, a pair of contact points carried by and insulated from the armature, a pair of insulating sockets carried by the armature for receiving said contact points, upon the attracting of the armature, and contact points normally arranged in said socket.

4. In an electrically operated device for vehicle signals, a casing, an electromagnet disposed in the casing adjacent to one end thereof, a guide shell disposed in the casing adjacent to the opposite end thereof and in alignment with the magnet, an armature for the electromagnet reciprocably mounted in the guide shell, the guide shell having a longitudinally extending guide groove formed in the inner face thereof, a stop pin carried by the armature and disposed in the groove, a socket of insulation fitted in the outer end of the armature, and an operating rod fitted in the socket and extending exterior of and supported by the casing.

LEE McGUIRE.